United States Patent [19]

Bracken, Jr.

[11] 3,921,393

[45] Nov. 25, 1975

[54] SCREW THREAD FUEL SLINGER

[75] Inventor: Joseph W. Bracken, Jr., Redford Township, Mich.

[73] Assignee: Eaton Corporation, Cleveland, Ohio

[22] Filed: Oct. 29, 1974

[21] Appl. No.: 518,682

[52] U.S. Cl. ............. 60/39.74 S; 239/223; 431/168
[51] Int. Cl.² ..................... F02M 39/02; F02C 7/22
[58] Field of Search ............................... 60/39.74 S; 239/215–218.5, 220, 223; 431/168, 169

[56] References Cited
UNITED STATES PATENTS

| | | | |
|---|---|---|---|
| 2,705,401 | 4/1955 | Allen et al. | 60/39.74 S |
| 3,204,408 | 9/1965 | Vincent | 60/39.74 S |
| 3,373,562 | 3/1968 | Wormser | 60/39.74 S |

Primary Examiner—C. J. Husar
Assistant Examiner—Robert E. Garrett
Attorney, Agent, or Firm—Teagno & Toddy

[57] ABSTRACT

A generally cup-shaped rotating fuel slinger having a radially outer axially extending annular portion defining a radially inner circular surface with a multiple lead screw thread impressed thereon for delivering fuel to an annular combustion chamber of a single shaft turbine engine. The slinger communicates at one end of the inner circular surface with the combustion chamber. The other end of the inner circular surface is sealed from the combustion chamber by a radially extending wall that is circumferentially secured to the outer annular portion and a central shaft member located between a radial turbine and a radial compressor. A single fuel delivery tube projects axially through a vane in the diffuser, radially along the diffuser, and then axially into an annular space defined between the inner circular surface and the periphery of the central shaft member. The delivery tube is used to deliver liquid fuel to the screw threads. In the disclosed embodiment the helix of the screw thread is impressed to force the liquid fuel back toward the sealed end of the inner circular surface of the slinger.

9 Claims, 3 Drawing Figures

SCREW THREAD FUEL SLINGER

BACKGROUND OF THE INVENTION

1. Field of the Invention

This invention relates generally to combustion products of mixed fluid power plants and more specifically to rotating fuel slingers of fuel injection systems for combustion products generators.

2. Description of the Prior Art

Annular combustion chambers are relatively light, inexpensive to manufacture and efficient. In using annular combustion chambers, it is necessary, in order to avoid hot spots which shorten combustor life and cold spots which promote the growth of deposits, to inject fuel uniformly around the chamber.

Uniform fuel injection can be accomplished by using known centrifugal fuel injection systems. One such known centrifugal fuel injection system is illustrated in U.S. Letters Patent application Ser. No. 214,703 assigned to the assignee of the present application. That fuel injection system comprises an axially extending circular wall in the shaft assembly of a turbine engine which terminates at a number of radially extending injection passages that project into an annular combustion chamber. The circular wall and passages are an integral part of the rotating compressor-turbine shaft. Centrifugal force causes the fuel to spread out in a uniform thin layer on the circular wall and flow into the passages. The fuel acquires the tangential velocity of the wall's periphery and is thrown off into the combustion chamber with this velocity. Experience has shown that with such a fuel injection system the hole-to-hole distribution of the fuel is determined by the precision of manufacture of the internal surfaces of the circular wall. Bending of the shaft during rotation will result in eccentricity of the circular wall about the neutral axis causing the thin layer of fuel to become nonuniform with fuel building up along one portion of the circular wall and thinning out along the opposite portion of the circular wall. The nonuniform fuel layer will result in uneven fuel distributing through the passages and can result, in extreme conditions, in the stoppage of flow through some of the passages. When flow is stopped through some of the passages, the feeding passages provide fuel, at any instance, to only a portion of the combustion chamber. This instantaneous partial fuel feeding along with shaft rotation results in the rotation of a flame body around the combustion chamber that is synchronized with shaft speed. Besides reducing combustion chamber efficiency, the rotating flame body condition can also introduce undesirable noise to the operation of the engine. Further, a coking problem may result in those passages through which no liquid fuel is flowing thus causing the passage to become partially or completely blocked. Other fuel injection systems that operate in a similar manner are illustrated in U.S. Letters Pat. Nos. 2,416,389; 2,547,959 and 2,938,345 and French Pat. No. 1,284,281.

Another well known centrifugal fuel injection system, an example of which is illustrated in U.S. Pat. No. 2,659,196, comprises a rotating annular member having radially oriented passages communicating with the combustion chamber and an inner annular reservoir. Fuel is fed to the reservoir by a plurality of fuel delivery tubes that are stationary relative to the engine's housing. Fuel from each delivery tube is projected radially outwardly into the annular reservoir and then radially outwardly through the passages into the combustion chamber. The centrifugal force causes the fuel to be rapidly ejected through each of the passages over only a small angular portion of each revolution. With such an arrangement it is necessary to use a number of delivery tubes to ensure uniform circumferential fuel injection into the annular combustion chamber.

SUMMARY OF THE INVENTION

It is accordingly an object of the present invention to provide a simple and inexpensive rotating fuel slinger that delivers a circumferentially uniform spray of fuel.

A more specific object of the invention is to provide a rotating fuel slinger that requires a minimum number of fuel delivery tubes while providing maximum efficiency of fuel distribution.

According to a feature of the invention liquid fuel is introduced onto at least one screw thread provided on a radially inwardly facing axially extending, rotating circular surface that opens at one end within a combustion chamber. The fuel is introduced onto the screw thread from a non-rotating source so that the entering fuel virtually has no angular velocity. During the time that the fuel is being brought up to the angular velocity of the rotating surface, the screw thread acts to move the fuel axially along the rotating surface to build up a fuel reservoir adjacent one end of the surface; as the fuel attains the angular velocity of the rotating surface, it moves along the helix of the screw thread in the opposite axial direction and is ultimately discharged at the other end of the surface into the combustion chamber.

According to a further feature of the invention the screw thread has a multiple lead with circumferentially spaced grooves. This provides a multiplicity of flow paths for the discharging fuel and improves the circumferential uniformity of the distribution of the fuel into the combustion chamber.

DESCRIPTION OF THE PREFERRED EMBODIMENT

Figure 1:
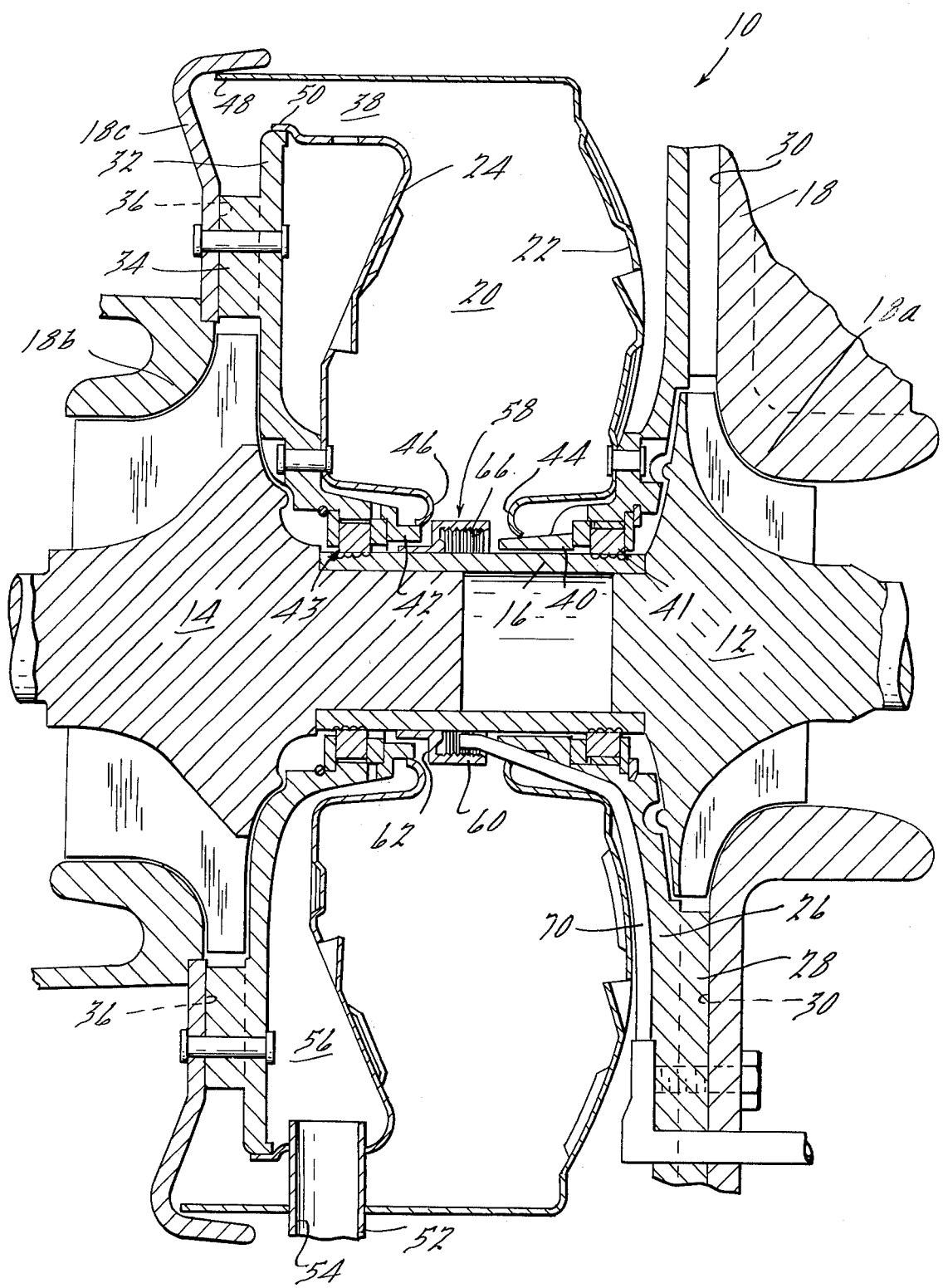
FIG. 1 is a fragmentary, sectional view of a gas turbine engine taken on a plane passing through the engine's center line and embodying features of the invention.

FIG. 1 illustrates an embodiment of the inventive fuel slinger in combination with a single shaft gas turbine engine 10 having a radial compressor 12 and a radial turbine 14 axially spaced from one another and interconnected via a central circular member 16. Compressor 12 and turbine 14 include stubs which project into complementary openings in central member 16. The compressor and turbine are respectively secured to the central member by a known method, such as inertia welding. Shaft assembly 12, 14, 16 is supported for rotation by known means, not illustrated, and is connected to appropriate power takeoff means, not illustrated, to remove shaft horsepower from the engine.

Although a given turbine engine configuration is illustrated, it should be appreciated that the inventive fuel slinger may be used in combination with any annular combustion chamber or may be located within any other combustion chamber in which it is desired to provide a uniform circumferential flow of fluid. The illustration of FIG. 1, therefore, is made only for the purpose of indicating a given embodiment for the inventive fuel slinger. It should be appreciated that another embodiment of a turbine engine, for example, one of those illustrated in U.S. Letters Pat. Nos. 2,659,196; 2,720,750; 2,938,345; 3,018,625; 3,115,011; 3,204,408; and 3,321,912 could have also been illustrated for the purpose of describing the invention. The illustrated engine was only chosen for the reason that applicant had done development work on an engine similar to the one illustrated in FIG. 1. This similar engine is described and illustrated in U.S. Pat. application Ser. No. 214,703 assigned to the assignee of the present application.

Referring now in greater detail to FIG. 1, a housing 18, only partially illustrated, enclosed an annular combustion chamber 20 defined by annular liners 22 and 24. The housing includes portions 18a and 18b which respectively shroud the radial blades of compressor 12 and 14. An annular diffuser plate 26, only partially illustrated, having cantilever vanes 28 defines together with an annular, radially extending portion of housing 18 a number of radially extending circumferentially spaced diffuser passages 30 which communicate with both the outlet from compressor 12 and with combustion chamber 20. An annular nozzle plate 32 having cantilever vanes 34 defines together with a portion 18c of housing 18 a number of radially extending circumferentially spaced nozzle passages 36 which communicate both with an annular axially extending exhaust passage 38 of combustion chamber 20 and with the inlet to turbine 14. Diffuser and nozzle plates 26 and 32 each have an axially extending hub portion, respectively, 40 and 42, that encircles central member 16. The hub portions are axially spaced relative to one another. A number of known seals, 41 and 43 illustrated but not further discussed, are interposed between hub portions 40 and 42 and central member 16 in a known manner.

Each liner 22 and 24 has an inner radial peripheral edge 44 and 46 respectively, circumferentially seated on hub portions 40 and 42 in spaced relationship to one another. The outer peripheral edge 48 of liner 22 is circumferentially seated against portion 18c of housing 18 while the outer peripheral edge 50 of liner 24 is circumferentially seated radially inwardly from the outer peripheral edge of liner 22 on nozzle plate 32. Liners 22 and 24 define together exhaust passage 38. A number of circumferentially spaced tubes 52, only one shown, traverse exhaust passage 38. Each tube 52 defines a passage 54 that communicates with the outlet from compressor 12 and an annular space 56 defines between liner 24 and nozzle plate 32.

Figure 2:
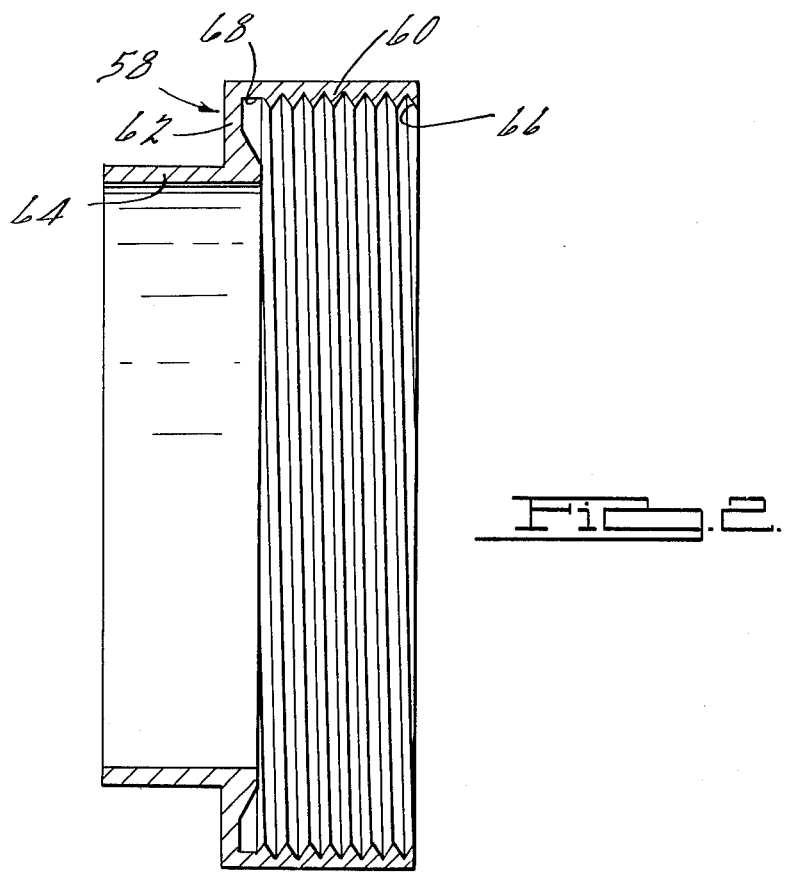
FIG. 2 is an enlarged sectional view of the fuel slinger illustrated in FIG. 1.

As illustrated in FIGS. 1 and 2 the inventive fuel slinger 58 is an annular cup-shaped member which is located within the space defined intermediate hub portions 40 and 42 of diffuser and nozzle plates 26 and 32. Fuel slinger 58 includes an annular radially outer axially extending portion 60 concentric with the axis of shaft assembly 12, 14, 16 an annular radially extending portion 62, and an annular radially inner axially extending portion 64 encircling central member 16 and secured thereto by shrink fit, welding, fasteners or the like. A triple lead screw thread 66 is cut into the radially inwardly facing surface 68 of radially outer portion 60. Each helical groove of screw thread 66 opens at one end into combustion chamber 20 in 120 degree circumferential spaced relationship to the other grooves. A single fuel delivery tube 70 projects axially through housing 18, a cantilever vane 28, and diffuser plate 26 and then radially inwardly along the inner surface of diffuser plate 26 and then axially along hub portion 40 of diffuser plate 26 into an annular space defined between screw thread 66 on radially outer portion 60 and the outer periphery of the respective encircled portion of central member 16. Delivery tube 70 preferably projects radially upwardly from the base of the engine to the lowest most portion of fuel slinger 58 to ensure that when fuel flow is stopped the fuel in the radial portion of the tube will not drain into the fuel slinger. A constant pressure fuel pump, controlled by an appropriate fuel control mechanism, not illustrated, supplies fuel to the passage within fuel delivery tube 70.

Figure 3:
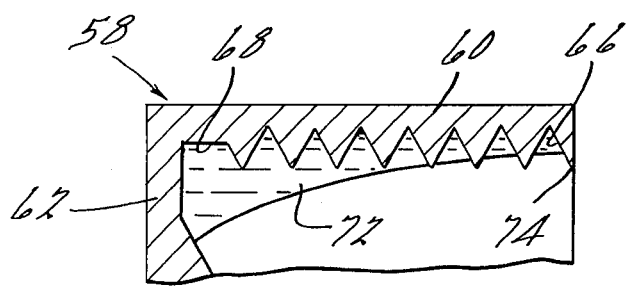
FIG. 3 is an enlarged view of a portion of the fuel slinger illustrated in FIG. 2.

In operation, by viewing the engine from the compressor end, shaft assembly 12, 14, 16 rotates counter-clockwise. With counterclockwise rotation it is preferable to have right-hand helixs on screw thread 66 to force the fuel traveling at an angular velocity less than that of the angular velocity of the periphery of screw threads 66 inwardly toward radial portion 62 of fuel slinger 58. In this way, as the fuel attains the angular velocity of the periphery of screw thread 66 it will begin moving toward the combustion chamber 20 via the helical grooves. It is believed that during operation, as shown in FIG. 3, fuel builds up in an annular layer 72 within fuel slinger 58 that is radially thickest adjacent radial portion 62 and progressively thins toward the open end of the fuel slinger. Fuel build-up layer 72 is caused by screw thread 66 forcing fuel toward radial portion 62. The force created by the rotation of fuel slinger 58 forces the fuel traveling at the angular velocity of the peripheral of screw thread 66 out into combustion chamber 20 in a uniform flow. It should be appreciated that left-hand helixs can also be used but would not be as effective as right-hand helixs in the disclosed embodiment due to the fact that the helix's of screw thread 66 would drive the fuel out of the open end of the helical grooves into combustion chamber 20 as soon as the fuel reached the screw thread. This could result in a somewhat less uniform flow than that achieved with a right-hand screw thread. It may readily be seen that fuel slinger 58 can be simply and cheaply made from a metal stamping. Drainage problems do not exist with the disclosed fuel slinger inasmuch as once the fuel supply is stopped the fuel within the fuel slinger will quickly acquire the angular velocity speed of screw thread 66 and be thereafter thrown into combustion chamber 20. There are no dams or reservoirs or the like in the fuel slinger to trap the fuel and prevent its exit into combustion chamber 20 as with other known systems. Further, since fuel slinger 58 is not dependent upon an annular reservoir or dam arrangement concentricity is not as critical as it is with other systems.

With the disclosed fuel slinger it has been determined that only a single fuel supply tube 70, stationary with the engine, need be provided to supply fuel to screw thread 66. During operation, screw thread 66 is constantly rotating relative to the single stationary delivery tube. Fuel is, therefore, constantly being introduced into each of the helical grooves of the screw thread during rotation resulting in some fuel coming out of each of the ends of each of the helical grooves.

Although a triple lead screw thread is illustrated, the system will also function with more or less leads. In theory, the greater the number of leads the greater the uniformity of the fuel supply to combustion chamber 20. However, increases in the number of leads also results in increases in the helix angle of the helical groove which can be determined to efficient operation. In practice it is believed that a minimum of two leads of the screw thread, opening 180 degrees apart, will provide an adequate uniform fuel distribution. A single lead will work with less than uniform delivery but will provide a simple and inexpensive fuel slinger in applications where uniform fuel injection is not critical but cost is a factor. Further, as previously stated, the fact that dams or reservoirs are not used will offer a substantial advantage for the single lead screw thread over other prior art fuel injection system.

Although helical grooves are illustrated and described in the disclosed embodiment other pumping systems could also be employed. For example a number of spaced vanes set forth to form helixs on the radially inwardly facing surface 68 of fuel slinger 58 could be used to pump the fuel traveling at less than the angular velocity of surface 68 toward the closed end defined by portion 62 and allow fuel which attains the angular velocity of surface 68 to flow out of the open end of the fuel slinger into the combustion chamber.

Screw thread 66 may be V-shaped, square, round or the like. Square-shaped helical grooves offer some advantages over V-shaped helical grooves inasmuch as they present a greater surface area to shearing of the fuel. It has, however, been noted that satisfactory results have been achieved with V-shaped helical grooves. It may further be noted that screw threads 66 may be either cut, rolled or formed in any other manner onto radially inwardly facing surface 68.

It is desirable to maintain a given minimum depth for each helical groove which will ensure that the amount of fuel within the helical grooves will not project over the peaks 74 of the screw thread at the open end of fuel slinger 58. If fuel projection over peaks 74 does occur, the effectiveness of screw thread 66 is substantially lost.

What is claimed is:

1. A mixed fluid combustion products generator comprising:
   A. a housing;
   B. an axially extending shaft mounted for rotation relative to the housing;
   C. an annular liner defining a combustion chamber encircling the shaft;
   D. a fuel slinger secured to the shaft for rotation therewith and defining a radially inwardly facing generally axially extending surface concentric with the shaft axis and radially spaced from the outer periphery of the encircled shaft portion;
   E. means for supplying fuel to the inwardly facing surface; and
   F. screw thread means defining at least one helical groove on the inwardly facing surface having one end communicating chamber the combustion chamber for providing the primary path for fuel to flow from the inner surface to the combustion chamber.

2. A generator according to claim 1 wherein the screw thread means comprises multiple lead helical grooves with circumferentially spaced ends communicating with the combustion chamber.

3. a generator according to claim 1 wherein the fuel supply means comprises a single delivery tube secured to and stationary with the housing and projecting to a point adjacent a portion of the inwardly facing surface.

4. A generator according to claim 1 wherein the screw thread means defines at least one generally square screw thread.

5. A generator according to claim 1 wherein the screw thread means defines at least one generally "V" shaped screw thread.

6. A generator according to claim 1 wherein the screw thread means defines at least one generally round screw thread.

7. A generator according to claim 1 further comprising:
   G. means to rotate the shaft about the axis in one given direction; and wherein
   H. the screw thread means defines a helical groove having a helix to force, in response to rotation of the shaft in the given direction, the fuel in a direction away from the end of the helical groove communicating with the combustion chamber.

8. A generator according to claim 7 wherein the screw thread means defines a plurality of helical grooves with circumferentially spaced ends communicating with the combustion chamber and having helixs to force, in response to rotation of the shaft in the given direction, the fuel in a direction away from the ends of the helical grooves communicating with the combustion chamber.

9. A method of providing fuel to an annular combustion chamber comprising the steps of:
   A. providing a radially inwardly facing generally axially extending cylindrical surface opening at one end in the combustion chamber;
   B. rotating the cylindrical surface about its axis; and
   C. injecting fuel onto the cylindrical surface from a non-rotating source; then, irrespective of sequence,
   D. forcing the fuel traveling at an angular velocity less than that of the inner cylindrical surface in an axial direction away from the end opening into the combustion chamber, and
   E. forcing the fuel traveling at an angular velocity of the inner cylindrical surface in an axial direction toward the end opening into the combustion chamber for discharge into the combustion chamber.

* * * * *